Sept. 1, 1953  A. F. HICKMAN  2,650,439
SCOOP FOR ROTARY SNOWPLOWS
Filed Dec. 21, 1946  3 Sheets-Sheet 1
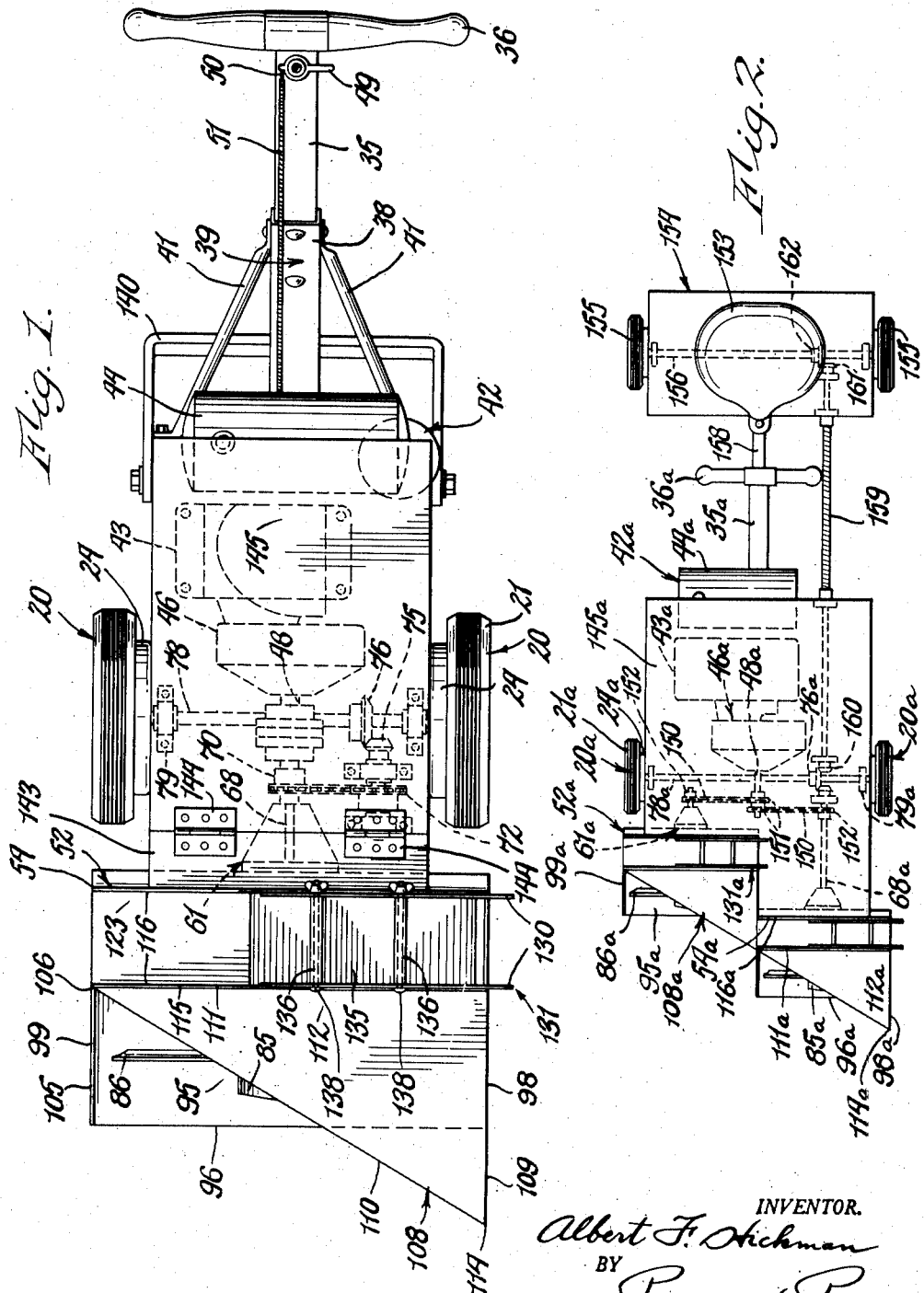
INVENTOR.
Albert F. Hickman
BY
Popp and Popp
Attorneys.

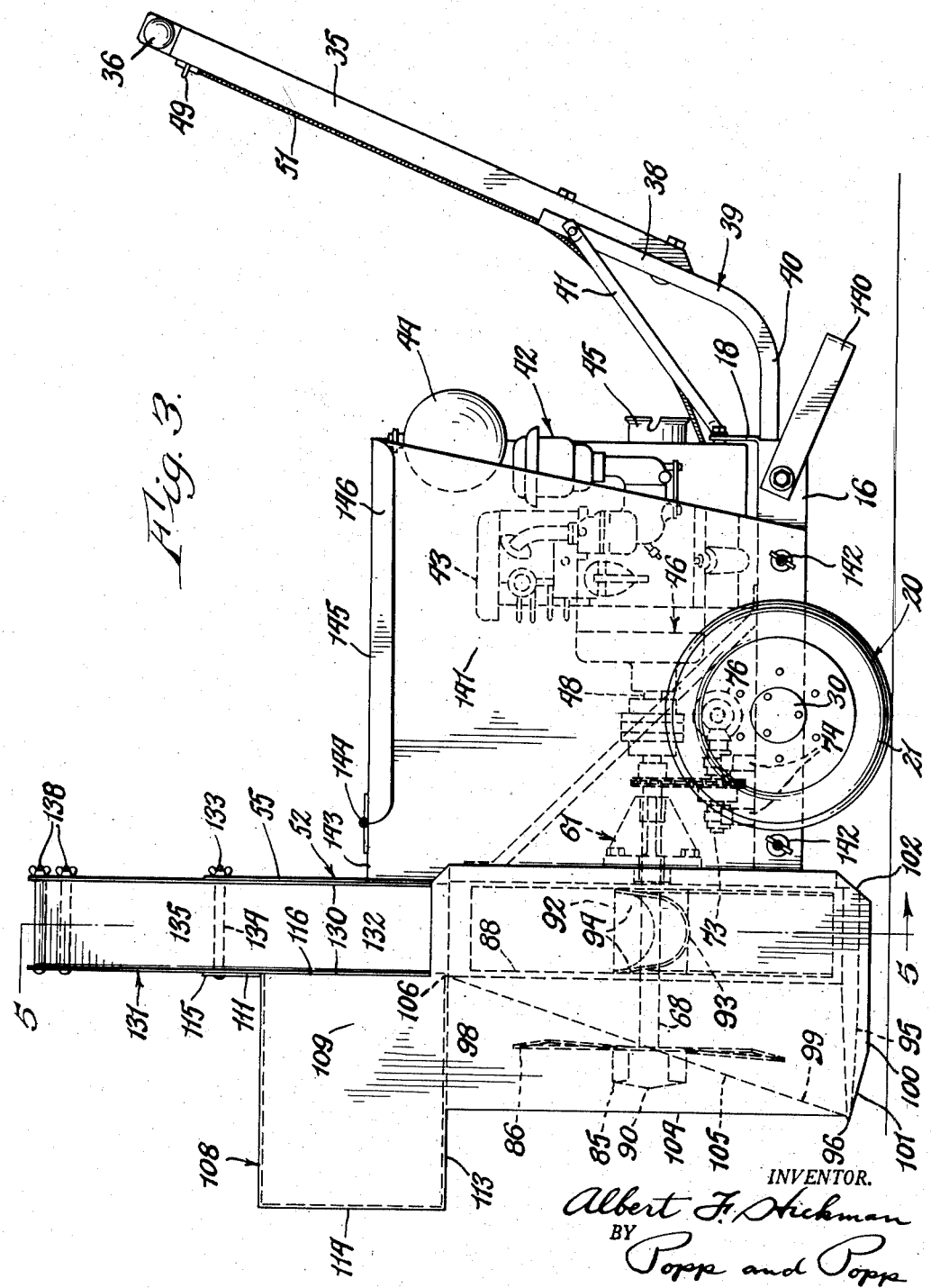

Sept. 1, 1953 A. F. HICKMAN 2,650,439
SCOOP FOR ROTARY SNOWPLOWS
Filed Dec. 21, 1946 3 Sheets-Sheet 3
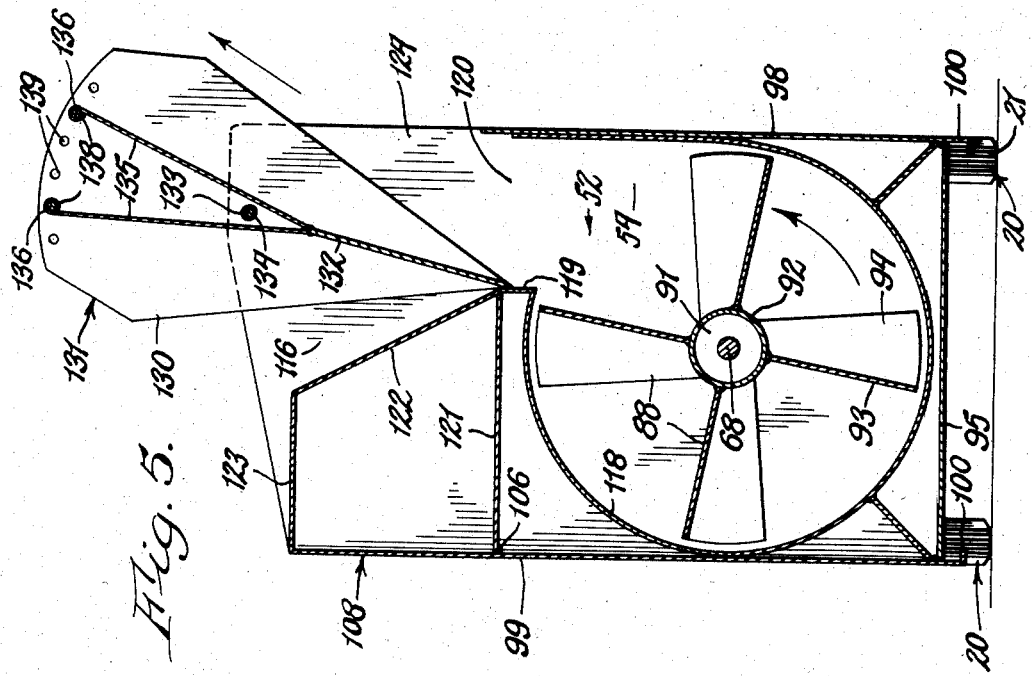
INVENTOR.
Albert F. Hickman
BY
Popp and Popp
Attorneys.

Patented Sept. 1, 1953

2,650,439

UNITED STATES PATENT OFFICE 2,650,439

SCOOP FOR ROTARY SNOWPLOWS

Albert F. Hickman, Eden, N. Y., assignor to Hickman Industries, Inc., Eden, N. Y., a corporation of New York Application December 21, 1946, Serial No. 717,709

2 Claims. (Cl. 37—43)

1

This invention relates to a scoop for rotary snowplows and more particularly to such a scoop for a hand operated rotary snowplow powered by one or more relatively low power gasoline engines.

One of the principal objects of the present invention is to provide such a scoop for rotary snowplows which reduces the power required for operation of the snowplow.

Another important object is to provide such a scoop for snowplows which operates at high efficiency with all types of snow varying from light freshly fallen snow to heavy partly frozen slush.

Another object is to provide such a scoop for rotary snowplows which will pass through snow of any depth or condition with a minimum effort on the part of the operator and which will leave a cleanly cleared path.

Another object is to provide such a scoop for rotary snowplows which is simple, sturdy and reliable in its construction and which will stand up under conditions of severe and constant use without getting out of order or requiring repairs.

Another object is to provide such a scoop for rotary snowplows which will readily cut through snow much deeper than the height of the plow itself.

Another aim is to provide such a scoop for rotary snowplows which is adapted for tandem arrangement to cut a swathe of any desired width or to facilitate plowing through snow of unusual depth.

Other objects and advantages of the invention will appear from the following description and drawings in which:

Fig. 1 is a top plan view of a rotary snowplow having a scoop embodying the present invention.

Fig. 2 is a view similar to Fig. 1 and showing a modified form of the invention adapted to cut a swathe twice as wide as with the form of the invention shown in Fig. 1.

Fig. 3 is a side elevation of the rotary snowplow shown in Fig. 1.

Fig. 4 is a front elevation of the form of rotary snowplow shown in Figs. 1 and 3.

Fig. 5 is a vertical transverse sectional view taken on line 5—5, Fig. 3.

In the form of the invention shown in Figs. 1 and 3-5 the snowplow is carried by a rectangular bed plate or chassis 16 having downturned flanges along its opposite sides, and an upturned flange 18 at its rear end. This bed plate is carried by a pair of wheels indicated generally at 20, each of these wheels being shown as made of cast metal and provided with a rubber tire 21 and as formed to provide an annular axially extending rim 24.

The hubs of the wheels are shown as enclosed by removable hub caps 30. The axis of the wheels 20 is preferably disposed forwardly of the center of gravity of the bed plate 16 and the parts mounted thereon.

The plow is shown as controlled by a handle 35 having a handle bar 36 and bolted at its lower end within the upwardly bent portion 38 of a channel 39, the lower horizontal part 40 of which extends centrally under and is welded to the underside of the bed plate 16. The handle is reinforced by a pair of diverging, diagonal tubular braces 41, the lower ends of which are bolted to the opposite extremities of the rear flange 18 of the bed plate and the upper ends of which are bolted to the upper extremity 38 of the channel 39.

A gas engine, indicated generally at 42, is mounted on the rear end of the bed plate 16 with its drive shaft extending fore-and-aft, this gas engine being shown as being of a type used in power lawn mowers and the like and developing one and one-half horse power. The gas engine unit is shown as having the usual cylinder block 43, overhead gas tank 44, starting pully 45 on which the usual starting rope (not shown) is wound preparatory to cranking the engine, and reduction gear case 46 from which the power take-off shaft 48 projects, this power take-off shaft being located at the center of the bed plate 16. The gas engine is shown as being under control of a throttle 49 pivoted on the handle 35 near the handle bar 36 and actuating a push-pull wire 50 housed within a flexible conduit 51 which extends downwardly along the handle 35 to the gas engine 42.

The bed plate 16 carries a vertical rectangular wall 52, this wall being sufficiently wide to extend beyond the track of the traction wheels 20. This wall provides a backbone for the stationary and rotary parts of the plow proper and to this end preferably has a core faced with a metal plate 54 on its front side and with a metal plate 55 on its rear side.

In line with the power take-off shaft 48 of the gas engine this wall is provided with a hole and a bearing bracket 61 is secured to the rear face of this wall around this hole. This bearing bracket carries a pair of spaced bearings for a main rotary plow shaft 68. This main rotary plow shaft 68 is thereby in line with the power take-off shaft 48 of the gas engine 42 and is connected thereto.

To propel the plow through power derived from the gas engine 42, a sprocket 70 is fast to the main rotary plow shaft 68 and is connected by a drive chain with a sprocket 72 fast to a short shaft 73 journalled in a pair of bearing blocks 74 secured to the bed plate 16. The rear end of this short shaft 73 carries a bevel pinion 75 meshing with a bevel gear 76 fast to a cross shaft 78. This cross shaft is journalled in bearing blocks 79 bolted on opposite sides of the bed plate 16 and the opposite ends of this cross shaft 78 carry pinions (not shown) which drive the traction wheels 20.

The rotor for handling the snow is fast to the forwardly projecting end of the main rotary plow shaft 68 and comprises three sets of blades, the first of these being an auger-like blade 85 for boring into the snow and preventing the building up of a snow cap at the hub of the rotor, the second of these being an airplane propeller-like blade 86 which breaks up the snow to condition it to be received and discharged centrifugally, and the third of these being a series of scoop-like blades 88 which discharge the snow centrifugally.

The propeller-like blade 86 is in the form of a strip of metal welded at its center to the end of the main rotary plow shaft 68 and preferably having its tapered ends feathered to impel the snow rearwardly. The auger-like blade 85 is in the form of a strip of sheet metal bent into the shape of the letter S, the rear edge thereof being welded to the forward face of the airplane propeller-like blade hub and the forward edge thereof preferably converging to a forwardly directed point 90 which is coincident with the axis of the main rotary plow shaft 68.

To support the centrifugally acting blades 88, a tubular hub is welded to the main rotary plow shaft 68 and is shown as comprising a pair of end disks 91 welded to the shaft and a cylindrical sleeve 92 welded to these end disks. Each blade 88 of which four are employed, is in the form of a sheet metal channel having a rounding bottom 93 and diverging flat sides 94, the outer end of each of these blades being deeper than its inner end, the edges of the blades converging toward the bottom thereof as they approach the sleeve 92 for this purpose. The inner extremity of each of these centrifugally acting blades 88 is welded to the face of the sleeve 92 with the lowermost part of its bottom 93 substantially coincident with a radius intersecting the axis of the main rotary plow shaft, as best shown in Fig. 5.

An important feature of the invention resides in the construction of the structure surrounding the rotor and serving to cut the swathe of snow, to lead the snow into the zone of action of the rotor, and to direct the discharge from the rotor. This structure is a sheet metal structure constructed as follows:

The lower end of the front facing metal plate 54 for the wall 52 is bent horizontally forwardly to provide a forwardly projecting horizontal blade or plowshare 95 underlaying the rotor and of a width substantially equal to the wall 52. The forward or cutting edge 96 of this horizontal blade or plowshare is shown as arranged parallel with the wall 52 and slightly in advance of the auger 85 so that this horizontal blade or plowshare is rectangular in plan.

The sheet or plate of metal 55 at the back of the wall 52 is bent forwardly at its opposite vertical edges to form vertical side blades or plowshares 98 and 99 at opposite sides of the rotor. Each of these side blades or plowshares 98, 99 is welded or otherwise suitably secured to the corresponding side edge of the horizontal blade or plowshare 95 and extends downwardly therefrom and is bent inwardly to form a runner 100 at each side of the rotor enclosing structure. To facilitate forward movement the front end of each runner 100 is preferably provided with a gentle incline or bevel on its underside, as indicated at 101, and a similar incline or bevel 102 is provided at the rear of each runner to facilitate backing up the plow. The front cutting edge 104 of the vertical cutting blade or plowshare 98 extends vertically upward from the front cutting edge 96 of the horizontal blade or plowshare 95 so as to completely flank the rotor, as best shown in Fig. 3. The front cutting edge 105 of the vertical cutting blade 99 is shown inclined, this cutting edge inclining backwardly and upwardly from the front edge of the horizontal blade or plowshare 95 to a point 106 defining the zone of operation of the scoops or centrifugal discharge blades 88.

A triangular box-like structure, indicated generally at 108, is mounted on the side above the rotor of the snowplow, this triangular box-like structure comprising a side wall 109 formed by an upward continuation of the side vertical blade or plowshare 98, a front rectangular wall 110 welded to the front edge of the wall 109 and extending to the point 106 of the vertical blade or plowshare 99, a rectangular rear wall 111 extending transversely of the machine and connecting the rear vertical edges of the walls 109 and 110 and triangular top and bottom walls 112 and 113. This triangular box-like structure therefore provides a forwardly pointed plow having its leading edge 114 in advance of the leading or cutting edge 104 of the vertical side blade or plowshare 98 and serves to topple the snow, when sufficiently deep, into the zone of operation of the rotor.

This rear wall 111 of the triangular box-like structure is extended upwardly, as indicated at 115, and the front face plate 54 of metal sheet is likewise extended upwardly to form a transverse straight-sided space 116 above the zone of operation of the scoops or centrifugally discharging blades 88. These blades are surrounded by a sheet metal scroll 118, one end of which lies against the vertical side blade or plowshare 98, and the intermediate part of which circles around the scoop-like blades 88 and terminates in an end 119 which is in spaced relation to the vertical side blade or plowshare 98 so as to form an upwardly directed discharge opening 120 for the scroll 118. The rear edge of this scroll is preferably welded to the front face plate or sheet 54 of the wall 52 and is of the same width as the space 116, its outlet opening 120 discharging into this space. The end 119 of the scroll is connected by a horizontal partition 121 with an intermediate part of the vertical side blade or plowshare 99 and also connected to this end 119 of the scroll is a wall 122 which inclines upwardly and laterally and terminates in a horizontal wall 123 which connects with the upper edge of the vertical blade or plowshare 99. The opposite edges of these walls 121, 122 are welded to the rear wall 111 of the triangular box-like structure and to the front facing plate or sheet 54 of the main supporting wall 52 so as to provide a throat 124 above the discharge opening 120 of the scroll.

The blades or plowshares 95, 98 and 99 cut a rectangular swathe and it is necessary to lead this rectangular swathe into the circular zone of action of the rotor. To this end a plate 125 is inserted in the rectangle formed by the blades or plowshares 95, 98 and 99 and the under wall 113 of the upper triangular box-like structure, this plate having a circular opening 126 which is of the same size as the scroll 118 and the edge of which is welded to the forward edge of this scroll. The outer edges of this plate are set forwardly from the edge of its circular opening so as to provide a generally conical structure, the inclined surfaces 128 leading the swathe of snow from the side rectangular blades or walls 95, 98, 99 and 113 into the inlet opening 126 of the scroll thereby, in effect, to convert the rectangular swathe into a circular swathe for handling by the rotor.

Quick operable means are provided for directing the stream of snow discharged by the scoop-like blades 88 of the rotor either to the right or left, these means also being adjustable to provide the desired elevation or trajectory of the stream of snow being discharged. These means are preferably constructed as follows:

The numeral 130 represents a pair of generally triangular side plates of a directing switch or valve, indicated generally at 131, these side plates being connected by a welded cross plate 132 which extends upwardly from the points of the side plates 130 centrally to a point adjacent the center of the side plates, as best shown in Fig. 5. This structure is pivoted to the rear wall 111 of the triangular box-like structure and to the front metal facing plate or sheet 54 of the main wall 52 by a bolt 133 which is surrounded by a spacing sleeve 134. The axis of the pivot bolt 133 is so located that the lower extremity of the cross plate 132 swings from one extremity of the scroll 118 to its opposite extremity, the cross plate in one extreme position directing the stream of snow from the scoop-edged blades 88 to the right and in its opposite extreme position deflecting this stream of snow to the left.

A pair of trajectory adjusting plates 135 extend between the side plates 130 of the valve or deflector and have their lower ends welded to the cross plate 132 and to the side plates 130, these adjusting plates flanking the pivot bolt 133 and having their ends free. The upper ends of these trajectory adjusting plates are provided with eyes 136 embracing cross bolts 138 which can be placed in different pairs of a series of bolt holes 139 provided along the upper edges of the side plates 130 concentric with the pivot bolt 133.

A simple stand is provided for lifting the traction wheels 20 from the ground so as to hold the plow against self-propelled movement. This stand comprises a U-shaped bar or yoke 140 having its legs or arms bolted to the rear ends of the side flanges of the bed plate 16 and capable of being swung downwardly to engage the ground. In the ground engaging position of this yoke the front end of the snowplow is supported on the runners 100 and the traction wheels 20 are lifted from the ground.

A housing is provided for the gas engine 42 and driving gear, this including a pair of side panels 141 removably bolted to the side flanges of the bed plate 16, as indicated at 142 and extending upwardly to a rearwardly projecting flange 143 provided at the upper end of the rear facing metal plate or sheet 55 of the main wall 52. To this flange 142 is hinged, as indicated at 144, a cover 145, this cover having side flanges 146 which embrace the side panels 141. It will be seen that the cover 145 can be readily lifted to provide access to the gas engine and driving gear and that for further access the side panels 141 can readily be removed.

In starting the snowplow the operator lifts the handle 36 and kicks the yoke or stand 140 to a vertical position, this supporting the snowplow on the runners 100 and yoke 140 with the traction wheels 20 out of contact with the ground. He then cranks the gas engine 42 through a rope applied to the starting pulley 45 and when started the gas engine drives the snowplow rotor shaft 68 from its out-put shaft 48, this plow rotor shaft in turn driving the traction wheels 20 through the sprocket 70, chain, sprocket 72, short shaft 73, bevel pinions 75 and 76, cross shaft 78 and pinions meshing with the internal ring gear teeth of the traction wheels 20. The operator then raises the stand or yoke 140 to its inoperative position and lowers the rear end of the snowplow to effect engagement between the traction wheels 20 and the ground, the snowplow being thereby self-propelling through the drive just described.

On being guided into the snow bank, the vertical side blade or plowshare 98 cuts one side of the swathe, the vertical side blade or plowshare 99 cuts the other side of the swathe, and the horizontal blade or plowshare 95 cuts the underside of the swathe. These blades or plowshares present thin cutting edges to the snowbank and hence offer little impedance to the movement of the plow, the traction wheels 20 being sufficient to propel the plow except under extremely adverse conditions where the operator assists by pushing the plow. Even under most adverse conditions, however, such as going uphill, cutting through heavy partly frozen slush and the like, no great physical effort is required on the part of the operator.

In the event the snowbank is deep enough the leading edge 114 of the triangular box-like structure engages the top of the swathe, the top so engaged being pushed sidewise along the inclined front wall 110 of this triangular box-like structure and toppling it into the zone of action of the snowplow rotor.

The swathe of snow so cut from the bank is first acted upon by the auger-like blade 85 which bores into the snow at the axis of the rotor and throws it laterally into the zone of effective action of the airplane propeller-like blades 86, this auger thereby preventing a snow nose being built up on the hub of the rotor and also rendering the airplane propeller-like blades 86 effective their full diametrical extent. These airplane propeller-like blades are pitched to cut into the swathe, break it up and discharge it rearwardly through the inlet opening 126 to the scroll 118 in which scroll the scoop-like blades 88 of the rotor are arranged. In this connection it will be noted that the conical plate 125 providing the inlet opening 126 to the scroll has its margins, particularly at the corners of the rectangular structure, provided by the blades or plowshares 95, 98 and 99 and underside 113 of the triangular box-like structure set forwardly from the inlet opening 126 so as to provide the conical faces 128 for transforming the rectangular cross sectional shape of the swathe into the round cross sectional shape of the inlet opening 126 to the scroll. It will be noticed that these conical faces 128 are in the rear of the airplane propeller-like blades 86, and hence in their zone of action so that these blades push the snow rearwardly past the contraction made by the plate 125 and into the eye or inlet opening 126 of the scroll 118.

When the valve or deflector structure is in the position shown in Fig. 5, the stream of snow discharged from the scroll outlet 120 is deflected to the port side by the port channel formed by the side plates 130 and central plates 132 and 135. The latter, through its bolt 138, can be adjusted along the bolt holes 139 to provide the desired trajectory. When the operator desires to discharge the snow to the starboard side he throws the top of the valve or deflector structure to its opposite extreme position shown in Fig. 4. In this latter position the snow is deflected to the starboard side by the starboard channel formed by the side plates 130 and central plates 132 and 135. The latter, through its bolt 138, can be adjusted along the bolt holes 139 to provide any desired trajectory.

The advantageous features of the invention, particularly in low power requirements, can be incorporated in a snowplow capable of cutting a swathe of any width, this form of the invention being illustrated in Fig. 2. This plow is the same as that shown in Figs. 1 and 3-5 except that it is twice as wide and has two rotors arranged side by side. A single gas engine of double the horsepower is employed, the output shaft of this gas engine being connected by chains 150 and sprockets 151, 152 with the rotary plow shafts. With such a heavier plow it is also desirable to utilize the weight of the operator for traction and for this purpose he is seated on a tractor seat 153 carried by a trailer 154 having traction wheels 155 driven by a cross shaft 156. This trailer 154 is connected by a link 158 with the bed plate of the snowplow. Power for driving the traction wheels 155 can be applied in any suitable manner as through a flexible drive shaft 159 connected through a bevel pinion 160 with the bevel gear 76a of the snowplow and through a pair of bevel gears 161 and 162 with the cross drive shaft 156 of the trailer. Since in other respects the snowplow shown in Fig. 2 is similar to the snowplow shown in Figs. 1 and 3-5, the description of the construction and operation is not repeated, the corresponding parts of the snowplow shown in Fig. 2 being distinguished by the suffix "a."

It will particularly be noted that the features of the invention contribute to the low power requirement of the snowplow so that a very low power gas engine can be employed. It will further be noted that the parts are arranged with the necessary compactness so that an excessively wide swathe is not required to be cut and that all parts are so constructed and arranged to provide minimum impedance so that undue manual effort is not required to use the plow even under extremely adverse conditions. It will therefore be seen that the rotary snowplow forming the subject of the present invention accomplishes all of the objectives set forth in a very low cost, easily manipulated and sturdy machine.

I claim:
1. A scoop for a rotary snowplow, comprising a single horizontal forwardly extending bottom plate having a straight forward edge extending transversely of the scoop and adapted to cut underneath a swathe of snow, a pair of straight vertical side blades fast to and rising from the ends of said bottom blade and arranged parallel with each other and with the path of movement of the snowplow to cut the sides of said swathe of snow, conically shaped plates rigidly secured at their forward ends to the forward parts of said bottom and side blades and converging rearwardly to provide a throat through which said swathe of snow passes, and a generally vertical plate fast to and bridging said side blades and extending from the rear end of one of said side blades to the forward end of the other side blade to topple the snow above said side blades into the space between said side blades.

2. A scoop for a rotary snowplow, comprising a single horizontal forwardly extending bottom plate having a straight forward edge extending transversely of the scoop and adapted to cut underneath a swathe of snow, a pair of straight vertical side blades fast to and rising from the ends of said bottom blade and arranged parallel with each other and with the path of movement of the snowplow to cut the sides of said swathe of snow, conically shaped plates rigidly secured at their forward ends to the forward parts of said bottom and side blades and converging rearwardly to provide a throat through which said swathe of snow passes, and a triangular box like structure above said side blades and including a generally vertical plate fast to and bridging said side blades and extending from the rear end of one of said side blades to the forward end of the other side blade to topple the snow above said side blades into the space between said side blades.

ALBERT F. HICKMAN.

References Cited in the file of this patent

UNITED STATES PATENTS

| Number | Name | Date |
| --- | --- | --- |
| 286,895 | Bier et al. | Oct. 16, 1883 |
| 328,993 | Witt | Oct. 27, 1885 |
| 450,487 | Haughawout | Apr. 14, 1891 |
| 775,293 | Bowman | Nov. 22, 1904 |
| 932,154 | Martin | Aug. 24, 1909 |
| 1,095,097 | Fournet | Apr. 28, 1914 |
| 1,155,975 | Van Antwerp | Oct. 5, 1915 |
| 1,274,708 | Grabau | Aug. 6, 1918 |
| 1,333,373 | Barry | Mar. 9, 1920 |
| 1,577,561 | Chiles | Mar. 23, 1926 |
| 1,770,587 | Carpenter | July 15, 1930 |
| 1,834,176 | Peterson et al. | Dec. 1, 1931 |
| 1,844,706 | Wandscheer | Feb. 9, 1932 |
| 1,848,554 | Smith et al. | Mar. 8, 1932 |
| 2,168,866 | Gehl | Aug. 8, 1939 |
| 2,315,007 | Morse et al. | Mar. 30, 1943 |
| 2,408,459 | Tuttle | Oct. 1, 1946 |

FOREIGN PATENTS

| Number | Country | Date |
| --- | --- | --- |
| 24,025 | Sweden | Feb. 1, 1908 |